(12) United States Patent
Iio et al.

(10) Patent No.: US 7,362,929 B2
(45) Date of Patent: Apr. 22, 2008

(54) OPTICAL SWITCH

(75) Inventors: Shinji Iio, Tokyo (JP); Masayuki Suehiro, Tokyo (JP); Shinichi Nakajima, Tokyo (JP); Yoshiyuki Asano, Tokyo (JP); Chie Sato, Tokyo (JP); Morio Wada, Tokyo (JP); Akira Miura, Tokyo (JP); Tsuyoshi Yakihara, Tokyo (JP); Shinji Kobayashi, Tokyo (JP); Sadaharu Oka, Tokyo (JP); Mamoru Hihara, Tokyo (JP); Katsuya Ikezawa, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 11/312,419

(22) Filed: Dec. 21, 2005

(65) Prior Publication Data
US 2006/0165348 A1 Jul. 27, 2006

(30) Foreign Application Priority Data
Dec. 24, 2004 (JP) .......................... P.2004-372504

(51) Int. Cl.
*G02B 6/26* (2006.01)
(52) U.S. Cl. ............................ 385/16; 385/18; 385/20; 385/21; 385/45
(58) Field of Classification Search ............ 385/16–18, 385/20, 21, 24, 39, 40, 4, 8, 9, 45
See application file for complete search history.

(56) References Cited

U.S. PATENT DOCUMENTS 5,911,018 A * 6/1999 Bischel et al. ................ 385/16
6,744,945 B2 * 6/2004 Kinoshita et al. ............. 385/24

FOREIGN PATENT DOCUMENTS

| JP | 6-59294 A | 3/1994 |
| JP | 6-130236 A | 5/1994 |
| JP | 6-194696 A | 7/1994 |
| JP | 2004-20909 A | 1/2004 |
| JP | 2004-264631 A | 9/2004 |

OTHER PUBLICATIONS

Baojun Li, et al., "2×2 Optical Waveguide Switch with Bow-Tie Electrode Based on Carrier-Injection Total Internal Reflection in SiGe Alloy", IEEE Photonics Technology Letters, vol. 13, No. 3, Mar. 2001, pp. 206-208.

* cited by examiner

*Primary Examiner*—Brian Healy
*Assistant Examiner*—Hung Lam
(74) *Attorney, Agent, or Firm*—Sughrue Mion, PLLC

(57) ABSTRACT

An optical switch changes over transmission paths of an optical signal by a refractive index change. The optical switch has an optical waveguide layer having an optical waveguide whose output path of an optical signal branches into two, and reflection diffusing ditches which are provided in a portion outside the optical waveguide in the optical waveguide layer, wherein the portion is closed to a branch portion of the optical waveguides. The reflection diffusing ditches extend in a direction crossing a traveling direction of the optical signal.

19 Claims, 5 Drawing Sheets

OPTICAL SWITCH

CROSS-REFERENCE TO RELATED APPLICATIONS

This application is based upon and claims the benefit of priority from the prior Japanese Patent Applications No. 2004-372504, filed on Dec. 24, 2004, the entire contents of which are incorporated herein by reference.

BACKGROUND OF THE INVENTION

1. Field of the Invention

The present invention relates to an optical switch which changes over the transmission paths of an optical signal by a refractive index change, and more particularly to an optical switch which enables to reduce crosstalk.

2. Description of the Related Art

LAN (Local Area Network), WAN (Wide Area Network), etc. which are present-day communication networks, are based on communication schemes in which information items are usually transmitted with electric signals.

A communication method which transmits information with an optical signal, is employed in only a trunk network and some other networks in which large quantities of data are transmitted. Besides, these networks perform "point to point" communications, and it is the actual situation that they have not yet progressed to a communication network which can be termed a "photonic network".

In order to realize such a "photonic network", there are necessitated an "optical router", an "optical switching hub", etc. which have functions similar to those of devices such as a router and a switching hub for changing over the transmission destinations of electric signals.

Besides, such a device requires an optical switch for changing over transmission paths at high speed. Known as the optical switch is one which employs a ferroelectric such as lithium niobate or PLZT (Lead Lanthanum Zirconate Titanate), or one in which optical waveguides are formed in a semiconductor, and carriers are injected into the semiconductor so as to change a refractive index and to change over the transmission paths of an optical signal.

Further, there is recently known an optical switch in which heat is generated by a heater integrated on a plane-glass optical waveguide, and the refractive index of a part formed with the heater is changed, thereby to perform a switching operation.

The following documents are referred to as a related-art optical switch in which optical waveguides are formed in a semiconductor, and carriers are injected into the semiconductor so as to change a refractive index and to change over the transmission paths of an optical signal.

Document 1: JP-A-06-059294

Document 2: JP-A-06-130236

Document 3: JP-A-06-194696

Document 4: JP-A-2004-020909

Document 5: JP-A-2004-264631

Document 6: "2×2 Optical Waveguide Switch with Bow-Tie Electrode Based on Carrier-Injection Total Internal Reflection in SiGe Alloy", Baojun Li and Soo-Jin Chua, p206-p208, IEEE PHOTONIC TECHNOLOGY LETTERS, VOL. 13, NO. 3, MARCH 2001

FIGS. 3 and 4 are a plan view and a sectional view showing an example of the related-art optical switch stated in document 6, respectively. In FIG. 3, numeral 1 designates an optical waveguide layer having "X-shaped" optical waveguides "WG01" and "WG02", and numerals 2 and 3 designate a pair of electrodes for injecting carriers.

Referring to FIG. 3, the "X-shaped" optical waveguides are formed on the optical waveguide layer 1, and the oblong electrode 2 is formed at the crossing part of the "X-shaped" optical waveguides as shown at "CP01" in FIG. 3. Besides, the oblong electrode 3 is formed near the crossing part of the "X-shaped" optical waveguides and in parallel with the electrode 2.

On the other hand, FIG. 4 is the sectional view taken along line "A-A'" in FIG. 3. Referring to FIG. 4, numeral 1 and signs "WG01" and "WG02" are the same as in FIG. 3, respectively. Further, numeral 4 designates a clad layer, and numeral 5 a substrate.

The clad layer 4 and the optical waveguide layer 1 are successively formed on the substrate 5, and the "X-shaped" optical waveguides as shown at "WG01" and "WG02" in FIG. 4 are formed in the optical waveguide layer 1. Besides, the optical waveguides formed in the optical waveguide layer 1 are ones of ridge type, and an optical signal is distributively propagated as shown at "PS01" in FIG. 4 by way of example.

Here, the operation of the related-art example shown in FIG. 3 will be described with reference to FIG. 4. In a case where the optical switch is "OFF", any current is not fed to the electrodes 2 and 3.

Therefore, the refractive index of the crossing part of the "X-shaped" optical waveguides as shown at "CP01" in FIG. 3 does not change. Consequently, by way of example, the optical signal inputted from an input or entrance end shown at "PI01" in FIG. 3 proceeds rectilinearly through the crossing part and is outputted from an output or exit end shown at "PO01" in FIG. 3.

In contrast, in a case where the optical switch is "ON", electrons are injected from the electrode 2, and holes are injected from the electrode 3, so that the carriers (electrons, holes) are injected into the crossing part.

Owing to a plasma effect, therefore, the refractive index of the crossing part of the "X-shaped" optical waveguides as shown at "CP01" in FIG. 3 changes so as to lower. Consequently, by way of example, the optical signal inputted from the input end shown at "PI01" in FIG. 3 is totally reflected at the low index part generated at the crossing part shown at "CP01" in FIG. 3 and is outputted from an output or exit end shown at "PO02" in FIG. 3.

As a result, the position from which the optical signal is outputted can be controlled, in other words, the propagation path of the optical signal can be changed over, in such a way that the refractive index of the crossing part of the "X-shaped" optical waveguides is controlled by feeding currents to the electrodes and injecting the carriers (holes, electrons) into the crossing part.

With the related-art example shown in FIGS. 3 and 4, the path of the optical signal was examined by simulations, etc. Then, although the optical waveguides through which the optical signal is propagated are changed over by the "ON/OFF" operation of the optical switch, there has been the problem that part of the optical signal leaks out to a part outside the optical waveguides irrespective of the "ON" or "OFF" state of the optical switch.

As the cause of such a problem, it is conjectured that, since the shapes of at least two optical waveguides change conspicuously at a part where the waveguides cross, the waveguiding mode of light will change to incur reflection or scatter.

That is, in an optical switch in which the plurality of optical waveguides cross, the leakage of the light attributed to the reflection or scatter exists more or less.

In the configuration of the optical switch as shown in FIG. 3, such leakage of the light is little influential for the reason that the light having leaked out to the part outside the optical waveguides is difficult of arriving at the output ends shown at "PO01" and "PO02" in FIG. 3.

However, in a case where the optical switches as shown in FIG. 3 are integrated as shown in FIG. 5, the light having leaked out to the part outside the optical waveguides will flow into (combine with) another optical waveguide again at a high possibility.

FIG. 5 is a plan view of the optical switch in which the optical switches as shown in FIG. 3 are integrated. Referring to FIG. 5, numeral 6 designates an optical waveguide layer having "X-shaped" optical waveguides "WG11" and "WG12", and also having "y-shaped" optical waveguides which branch at different angles from the intermediate parts of the "X-shaped" optical waveguides on the output or exit end sides thereof, respectively.

Regarding the optical switch in FIG. 5, electrode pairs for injecting carriers are respectively required at the crossing part of the optical waveguides as shown at "CP11" in the figure, and the branch portions of the optical waveguides on the output end sides thereof as shown at "BP11" and "BP12" in the figure. In FIG. 5, however, the electrode pairs are omitted from illustration.

Here, the operation of the related-art example shown in FIG. 5 will be briefly described. By way of example, on condition that the crossing part shown at "CP11" in FIG. 5 has its refractive index lowered by the injection of the carriers (in an "ON" state), an optical signal inputted from an input or entrance end shown at "PI11" in the figure is reflected toward the branch portion shown at "BP11" in the figure. Subsequently, on condition that the branch portion shown at "BP11" in FIG. 5 has its refractive index lowered by the injection of the carriers (in an "ON" state), the optical signal is further reflected by the branch portion shown at "BP11" in the figure and is outputted from an output or exit end shown at "PO12" in the figure.

Also, by way of example, on condition that the carriers are not injected into the crossing part shown at "CP11" in FIG. 5 (in an "OFF" state), the optical signal inputted from the input end shown at "PI11" in the figure proceeds rectilinearly toward the branch portion shown at "BP12" in the figure. Subsequently, on condition that the carriers are not injected into the branch portion shown at "BP12" in FIG. 5 (in an "OFF" state), the optical signal further proceeds rectilinearly and is outputted from an output end shown at "PO14" in the figure.

That is, the optical signal inputted from the input end shown at "PI11" in FIG. 5 can be outputted from any of output ends shown at "PO11", "PO12", "PO13" and "PO14" in the figure, by controlling the injections of the carriers into the crossing part shown at "CP11" in the figure and the branch portions shown at "BP11" and "BP12" in the figure.

Here, light which has leaked out to a part outside the X-shaped optical waveguides at the crossing part shown at "CP11" in FIG. 5, as shown at "LK11" in the figure, will flow into (combine with) the optical waveguide as shown at "WG13" or "WG14" in the figure, at a high possibility.

By way of example, even in a case where the optical switch is controlled so as to output the optical signal from the output end shown at "PO14" in FIG. 5, by switching, an optical signal is outputted also from the output end shown at "PO12" or "PO13" in the figure, in other words, crosstalk occurs.

SUMMARY OF THE INVENTION

An object of the present invention is to provide an optical switch which enables to reduce the crosstalk.

The invention provides an optical switch, having: an optical waveguide layer having an optical waveguide whose output path of an optical signal branches into two; and a reflection diffusing ditch which is provided in a portion outside the optical waveguide in the optical waveguide layer, wherein the portion is closed to a branch portion of the optical waveguide, wherein the reflection diffusing ditch extends in a direction crossing a traveling direction of the optical signal.

The invention also provides an optical switch, having: an optical waveguide layer having an optical waveguide whose output path of an optical signal branches into two; and a plurality of reflection diffusing ditches which are provided in a portion outside the optical waveguide in the optical waveguide layer, wherein the plurality of the reflection diffusing ditches extend in a direction crossing a traveling direction of the optical signal.

The optical switch has a semiconductor substrate; a clad layer formed on the semiconductor substrate; the optical waveguide layer formed on the clad layer; and a pair of electrodes which inject carriers into the branch portion of the optical waveguide.

In the optical switch, the reflection diffusing ditch(s) pierces through the optical waveguide layer.

In the optical switch, the reflection diffusing ditch(s) is formed by etching.

In the optical switch, the reflection diffusing ditch(s) is formed by direct drawing based on a focused ion beam apparatus.

In the optical switch, the optical waveguide has a shape that two straight optical waveguides intersect with each other.

In the optical switch, the optical waveguide has a shape that one straight optical waveguide branches off at different angles.

According to the optical switch, the optical switch enables to reduce the crosstalk.

DETAILED DESCRIPTION OF THE PREFERRED EMBODIMENTS

Figure 1:
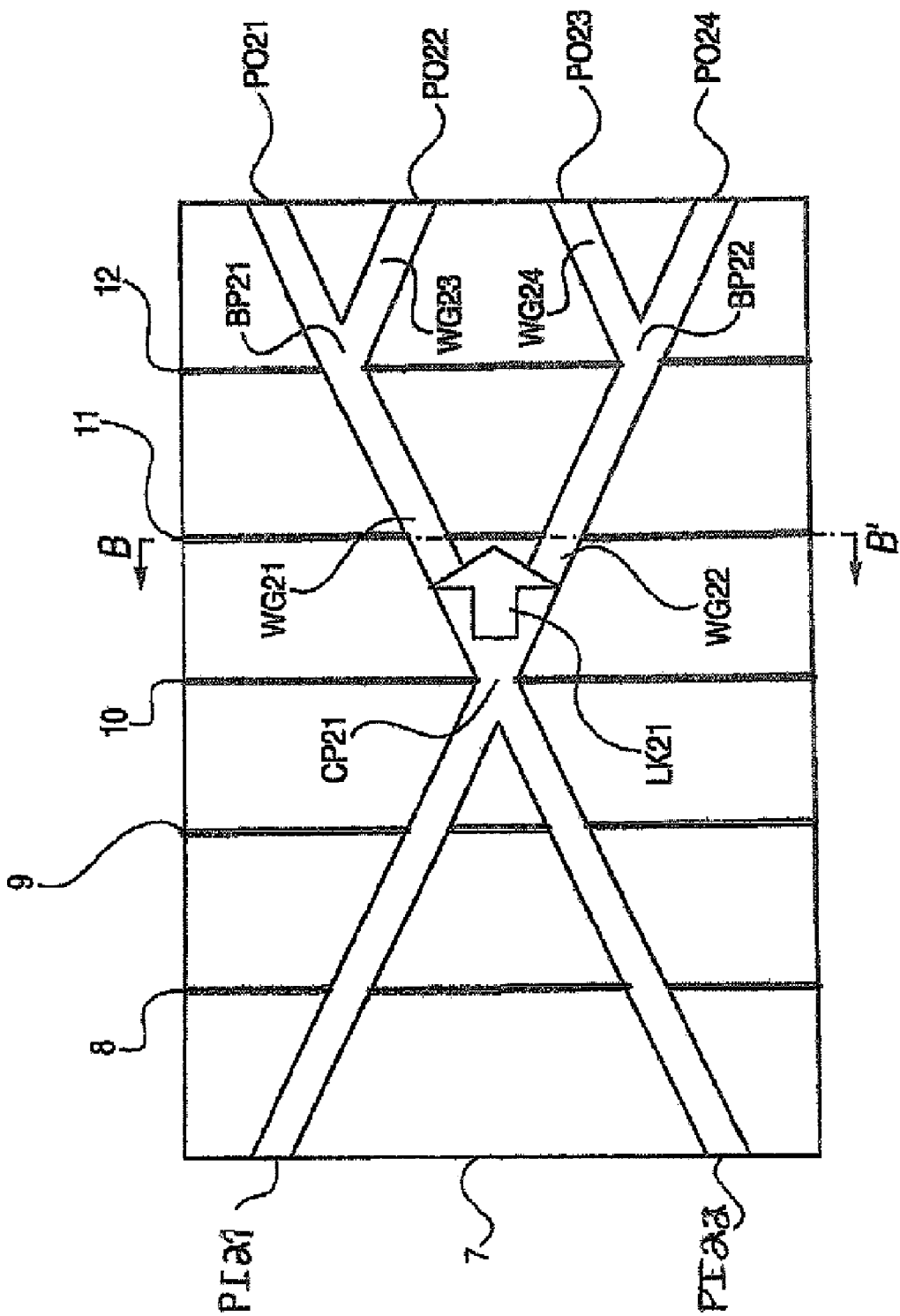
FIG. 1 is a plan view showing an embodiment of an optical switch according to the present invention.
Figure 2:
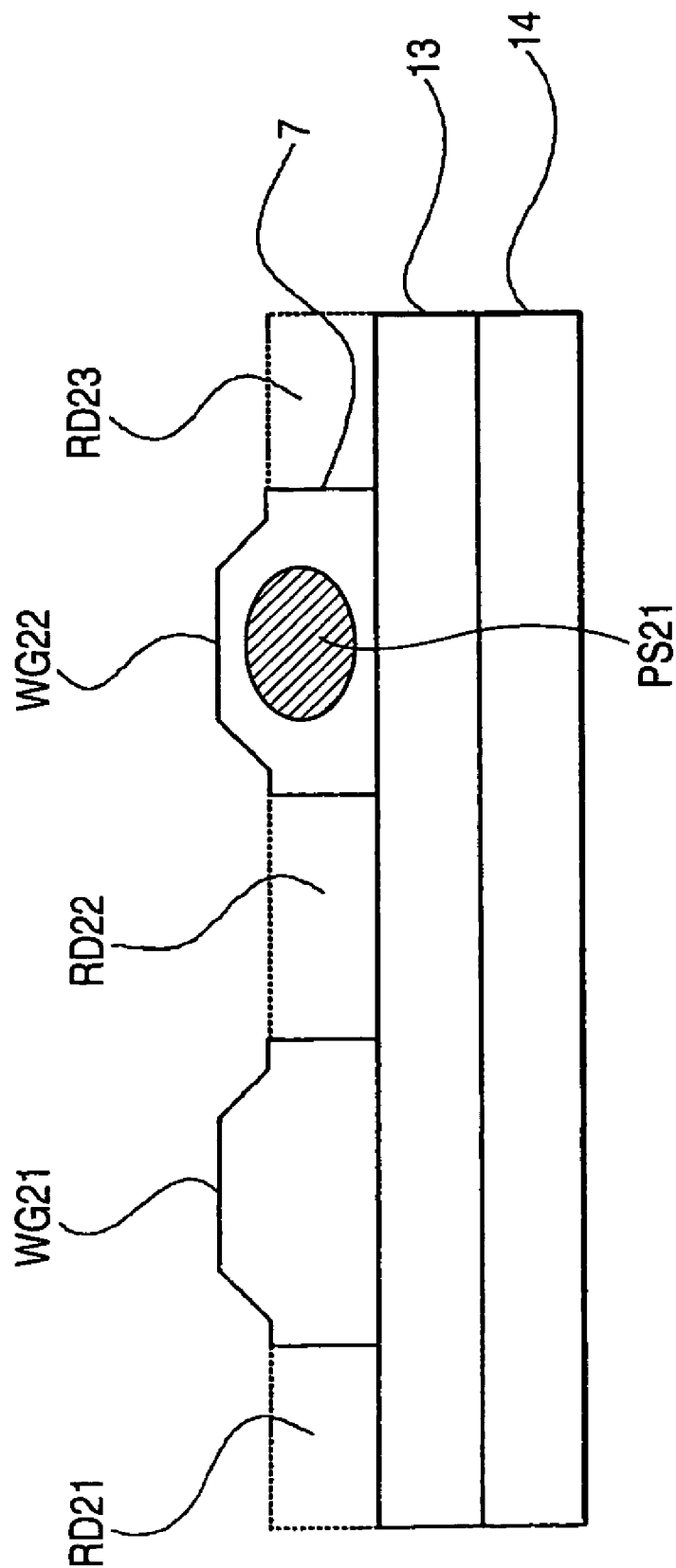
FIG. 2 is a sectional view showing the embodiment of the optical switch according to the invention.
Figure 3:
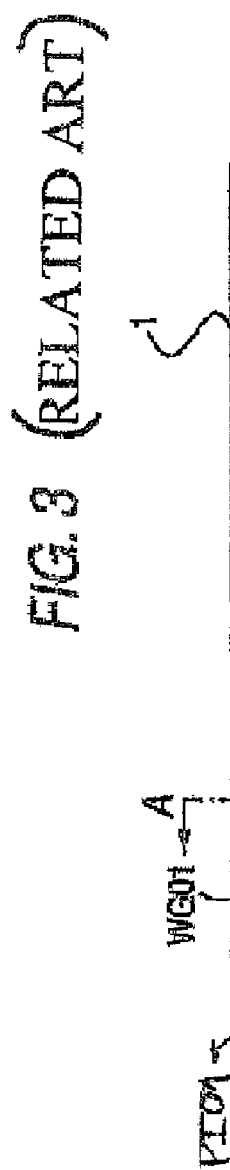
FIG. 3 is a plan view showing an example of an optical switch in the related art.
Figure 4:
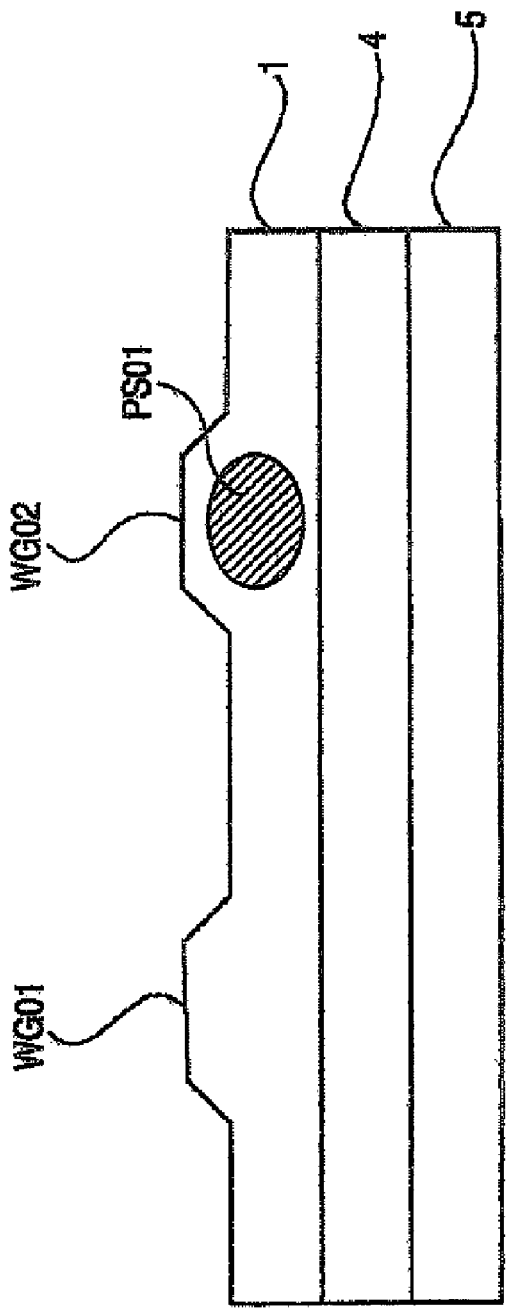
FIG. 4 is a sectional view showing the example of the related-art optical switch.

An embodiment of the present invention will be described in detail with reference to the drawings. FIGS. 1 and 2 are a plan view and a sectional view showing the embodiment of an optical switch according to the invention, respectively.

Referring to FIG. 1, numeral 7 designates an optical waveguide layer having "X-shaped" optical waveguides "WG21" and "WG22", and also having "y-shaped" optical waveguides which branch at different angles from the intermediate parts of the "X-shaped" optical waveguides on the output or exit end sides thereof, respectively. Numerals 8, 9, 10, 11 and 12 designate reflection scattering ditches which are juxtaposed in the widthwise direction of the optical waveguide layer 7.

In the optical switch shown in FIG. 1, the optical waveguide layer 7 is formed with the "X-shaped" optical waveguides "WG21" and "WG22", and the "y-shaped" optical waveguides which branch at the different angles from the intermediate parts of the "X-shaped" optical waveguides on the output end sides thereof, respectively. Besides, the reflection scattering ditches 8, 9, 10, 11 and 12 are formed at the parts of the optical waveguide layer 7 outside the optical waveguides "WG21" and "WG22", so as to extend in parallel in the widthwise direction of the optical waveguide layer 7 and to pierce through the optical waveguide layer 7.

Regarding the optical switch in FIG. 1, electrode pairs for injecting carriers are respectively required at the crossing part of the optical waveguides as shown at "CP21" in the figure, and the branch portions of the optical waveguides on the output end sides thereof as shown at "BP21" and "BP22" in the figure. In FIG. 1, however, the electrode pairs are omitted from illustration.

On the other hand, FIG. 2 is the sectional view taken along line "B-B'" in FIG. 1. Referring to FIG. 2, numeral 7 and signs "WG21" and "WG22" are the same as in FIG. 1, respectively. Further, numeral 13 designates a clad layer, and numeral 14 a substrate.

The clad layer 13 and the optical waveguide layer 7 are successively formed on the substrate 14, and the optical waveguides as shown at "WG21" and "WG22" in FIG. 2 are formed in the optical waveguide layer 7. Besides, the optical waveguides formed in the optical waveguide layer 7 are ones of ridge type, and an optical signal is distributively propagated as shown at "PS21" in FIG. 2 by way of example.

Further, the reflection scattering ditches as shown at "RD21", "RD22" and "RD23" in FIG. 2 are respectively formed at the parts of the optical waveguide layer 7 outside the optical waveguides shown at "WG21" and "WG22" in FIG. 2, so as to reach the clad layer 13 (or to pierce through the optical waveguide layer 7).

Here, the operation of the embodiment shown in FIGS. 1 and 2 will be described. By way of example, on condition that the crossing part shown at "CP21" in FIG. 1 has its refractive index lowered by the injection of the carriers (in an "ON" state), an optical signal inputted from an input or entrance end shown at "PI21" in the figure is reflected toward the branch portion shown at "BP21" in the figure. Subsequently, on condition that the branch portion shown at "BP21" in FIG. 1 has its refractive index lowered by the injection of the carriers (in an "ON" state), the optical signal is further reflected by the branch portion shown at "BP21" in the figure and is outputted from an output or exit end shown at "PO22" in the figure.

Also, by way of example, on condition that the carriers are not injected into the crossing part shown at "CP21" in FIG. 1 (in an "OFF" state), the optical signal inputted from the input end shown at "PI21" in the figure proceeds rectilinearly toward the branch portion shown at "BP22" in the figure. Subsequently, on condition that the carriers are not injected into the branch portion shown at "BP22" in FIG. 1 (in an "OFF" state), the optical signal further proceeds rectilinearly and is outputted from an output end shown at "PO24" in the figure.

That is, the optical signal inputted from the input end shown at "PI21" in FIG. 1 can be outputted from any of output ends shown at "PO21", "PO22", "PO23" and "PO24" in the figure, by controlling the injections of the carriers into the crossing part shown at "CP21" in the figure and the branch portions shown at "BP21" and "BP22" in the figure.

Figure 5:
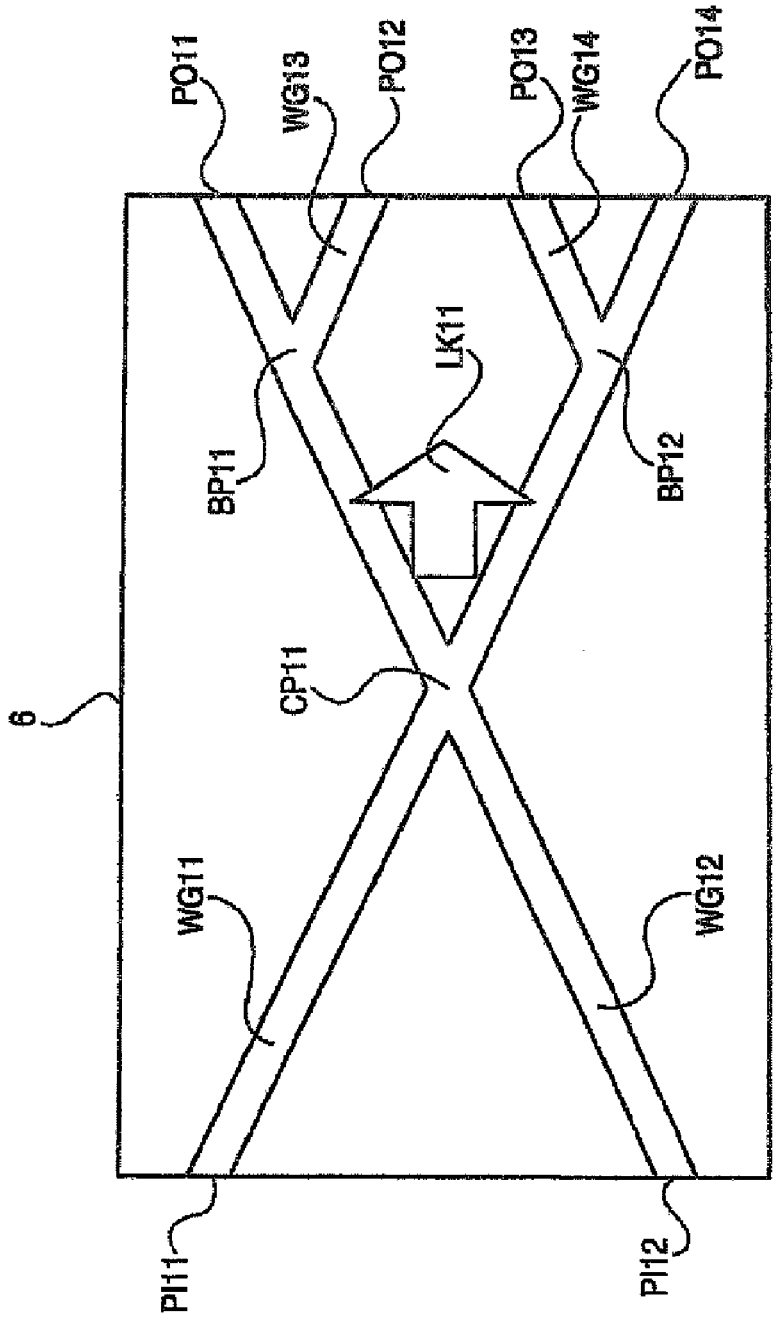
FIG. 5 is a plan view of an optical switch in which the optical switches as shown in FIG. 3 are integrated.

Even in a case where, in this state, light has leaked out to a part outside the X-shaped optical waveguides at the crossing part shown at "CP21" in FIG. 1, as shown at "LK21" in the figure, it is further reflection-scattered by the reflection scattering ditch 11. Therefore, the light can be relieved from flowing into (combining with) the optical waveguide as shown at "WG23" or "WG24" in FIG. 1, as in the related-art example shown in FIG. 5. In other words, it is permitted to reduce crosstalk.

As a result, the crosstalk can be reduced in such a way that the plurality of reflection scattering ditches which reflection-scatter light leaking out due to reflection or scatter at the crossing part of the optical waveguides or the branch portion of the optical waveguide are respectively formed at the parts of the optical waveguide layer 7 outside the optical waveguides so as to extend in parallel in the widthwise direction of the optical waveguide layer 7 and to pierce through the optical waveguide layer 7.

By the way, in the embodiment shown in FIG. 1, the plurality of reflection scattering ditches are formed at the parts of the optical waveguide layer 7 outside the optical waveguides so as to extend in parallel in the widthwise direction of the optical waveguide layer 7, but reflection scattering ditches may be formed so as to extend in a direction crossing the traveling direction of the optical signal.

Also, in the embodiment shown in FIG. 1, the reflection scattering ditches in the number of five are exemplified so that some of them may correspond to the crossing part and branch portions of the optical waveguides. It is a matter of course, however, that reflection diffusing ditches may be formed, for example, in the vicinities of those crossing part and branch portions of the optical waveguides from which light leaks out, as long as the light having leaked out to parts outside the optical waveguides can be sufficiently reflection-scattered and can be prevented from flowing into (combining with) the optical waveguides. Needless to say, the number and width of the reflection scattering ditches are at will.

Also, in the embodiment shown in FIG. 1, the reflection scattering ditches are formed so as to pierce through the optical waveguide layer 7. It is a matter of course, however, that reflection scattering ditches need not always pierce through the optical waveguide layer 7 as long as light having leaked out to parts outside the optical waveguides can be sufficiently reflection-scattered and can be prevented from flowing into (combining with) the optical waveguides.

Besides, regarding a method of forming the reflection scattering ditches, these ditches can be formed by etching based on an ordinary wafer process, and they may well be formed by direct drawing based on an FIB (Focused Ion Beam) apparatus.

Further, the embodiment shown in FIG. 1 exemplifies the optical waveguide layer having the "X-shaped" optical waveguides, and also having the "y-shaped" optical waveguides which branch at the different angles from the intermediate parts of the "X-shaped" optical waveguides on the output end sides thereof, respectively. The optical waveguide layer, however, may well be formed with optical waveguides by which an optical signal is inputted from one side of the optical waveguide layer, is branched into two midway and is outputted.

What is claimed is:

1. An optical switch, comprising:
    an optical waveguide layer having an optical waveguide whose output path of an optical signal branches into two; and
    a reflection diffusing ditch which is provided in a portion outside the optical waveguide in the optical waveguide layer, wherein the portion is close to a branch portion of the optical waveguide,
    wherein the reflection diffusing ditch extends in a direction crossing a traveling direction of the optical signal.

2. An optical switch, comprising:
    an optical waveguide layer having an optical waveguide whose output path of an optical signal branches into two; and
    a plurality of reflection diffusing ditches which are provided in a portion outside the optical waveguide in the optical waveguide layer,
    wherein the plurality of the reflection diffusing ditches extend in a direction crossing a traveling direction of the optical signal.

3. The optical switch according to claim 1, comprising:
    a semiconductor substrate;
    a clad layer formed on the semiconductor substrate;
    the optical waveguide layer formed on the clad layer; and
    a pair of electrodes which inject carriers into the branch portion of the optical waveguide.

4. The optical switch according to claim 2, comprising:
    a semiconductor substrate;
    a clad layer formed on the semiconductor substrate;
    the optical waveguide layer formed on the clad layer; and
    a pair of electrodes which inject carriers into a branch portion of the optical waveguide.

5. The optical switch according to claim 1,
    wherein the reflection diffusing ditch pierces through the optical waveguide layer.

6. The optical switch according to claim 2,
    wherein the reflection diffusing ditches pierce through the optical waveguide layer.

7. The optical switch according to claim 1,
    wherein the reflection diffusing ditch is formed by etching.

8. The optical switch according to claim 2,
    wherein the reflection diffusing ditches are formed by etching.

9. The optical switch according to claim 1,
    wherein the reflection diffusing ditch is formed by direct drawing based on a focused ion beam apparatus.

10. The optical switch according to claim 2,
    wherein the reflection diffusing ditches are formed by direct drawing based on a focused ion beam apparatus.

11. The optical switch according to claim 1,
    wherein the optical waveguide has a shape that two straight optical waveguides intersect with each other.

12. The optical switch according to claim 2,
    wherein the optical waveguide has a shape that two straight optical waveguides intersect with each other.

13. The optical switch according to claim 1,
    wherein the optical waveguide has a shape that one straight optical waveguide branches off at different angles.

14. The optical switch according to claim 2,
    wherein the optical waveguide has a shape that one straight optical waveguide branches off at different angles.

15. The optical switch according to claim 2, wherein the portion is close to a branch portion of the optical waveguide.

16. The optical switch according to claim 1, wherein the reflection diffusing ditch does not pierce the optical waveguide.

17. The optical switch according to claim 1, said reflection diffusing ditch comprising plural portions, each plural portion ending at the optical waveguide.

18. The optical switch according to claim 1, further comprising
    a pair of electrodes at the branch portion of the optical waveguide which inject carriers into the branch portion of the optical waveguide.

19. The optical switch according to claim 18, wherein the reflection diffusing ditch performs the same function regardless of the carriers injected into the branch portion of the optical waveguide.

* * * * *